(12) United States Patent
McDaniel et al.

(10) Patent No.: US 12,536,579 B2
(45) Date of Patent: Jan. 27, 2026

(54) METHODS AND A SYSTEM FOR IN-STORE NAVIGATION

(71) Applicant: NCR Voyix Corporation, Atlanta, GA (US)

(72) Inventors: Christian Lee McDaniel, Atlanta, GA (US); Alexander Simon Lewin, Marietta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 1025 days.

(21) Appl. No.: 17/366,451

(22) Filed: Jul. 2, 2021

(65) Prior Publication Data

US 2023/0005049 A1    Jan. 5, 2023

(51) Int. Cl.
*G06Q 30/0601* (2023.01)
*G06F 16/901* (2019.01)
*G06Q 10/047* (2023.01)
*H04L 67/133* (2022.01)

(52) U.S. Cl.
CPC ..... *G06Q 30/0639* (2013.01); *G06F 16/9024* (2019.01); *G06Q 10/047* (2013.01); *H04L 67/133* (2022.05)

(58) Field of Classification Search
None
See application file for complete search history.

(56) References Cited

U.S. PATENT DOCUMENTS

| | | | | |
|---|---|---|---|---|
| 2008/0077512 A1* | 3/2008 | Grewal | ............... | G06F 11/1448 705/28 |
| 2013/0283211 A1* | 10/2013 | Malkin | ................. | G06Q 10/06 715/844 |
| 2014/0108193 A1* | 4/2014 | Goulart | ................. | H04W 4/021 705/26.8 |
| 2020/0005385 A1* | 1/2020 | Stout | ..................... | G06Q 20/322 |
| 2020/0302510 A1* | 9/2020 | Chachek | ............ | G06Q 30/0639 |

FOREIGN PATENT DOCUMENTS

| CN | 107169591 A | * | 9/2017 | .......... G06Q 10/047 |
|---|---|---|---|---|
| CN | 114739408 A | * | 7/2022 | |

OTHER PUBLICATIONS

Translation of CN-114739408-A.*
J. Dong, M. Noreikis, Y. Xiao and A. Ylä-Jääski, "ViNav: A Vision-Based Indoor Navigation System for Smartphones," in IEEE Transactions on Mobile Computing, vol. 18, No. 6, pp. 1461-1475, Jun. 1, 2019, doi: 10.1109/TMC.2018.2857772 (Year: 2019).*

* cited by examiner

*Primary Examiner* — Michelle T Kringen
(74) *Attorney, Agent, or Firm* — Schwegman Lundberg & Woessner, P.A.

(57) ABSTRACT

A list of items to pick for an order at a store is obtained. A hierarchical graph of the store is maintained based on regions within the store, endpoints within the store, and locations of items relative to the regions and endpoints. Each item in the list is connected to its nearest endpoint within the graph and a path is found between the endpoints. An optimized and order list of the items is found based on an optimal path through each endpoint. For each segment within the path a list of traversed endpoints is identified. The endpoints are grouped by region; a new navigation instruction is generated only when a given region is changed. The process is repeated for each pair of items in the list; the list is reduced; and translated into text as an optimal path to pick the items of the order within the store.

20 Claims, 4 Drawing Sheets

METHODS AND A SYSTEM FOR IN-STORE NAVIGATION

BACKGROUND

With the advancement in technologies a variety of new jobs that were never conceivable just a few years ago have emerged in the industry, such as car drivers, delivery services, shopping services, etc. Workers only have to work when the worker is available and wants to work. The worker simply activates a mobile application from the location of the work and indicates that the worker is available for jobs. The service then routes customers information and/or ordering information to the worker and the job is performed. This is extremely convenient for the customers, the workers, the businesses that benefit from increased sales, and the third-party delivery or shopping services.

Yet, some of these types of jobs are more difficult and less automated than others. For example, professional shoppers that fulfill shopping lists by visiting a store on behalf of a customer, obtaining items on a shopping list of the customer at the store, paying for the items on behalf of the customer at the store, and delivering the items to the customer. These professional third-party shoppers are typically supplied an unordered list of the customer's items via their mobile application when they enter the customer-identified store. The items of the list include very little additional information that would be useful to the professional shopper in location the items within the store. At best, the professional shoppers are provided some coarse grain and general information about the locations of some items on the list within the store, such as an aisle number or a department name. These professional shoppers are expected to organize the list and find each item without any other aid.

This has created large inefficiencies in professional shopping jobs, as the professional shoppers take on lengthy lists and attempt to ad-hoc organize efficient routes through the stores on their own.

SUMMARY

In various embodiments, methods and a system for in-store navigation instructions are presented.

According to an aspect, a method for in-store navigation instructions is presented. A list of item identifiers for items and a store identifier for a store are received. A hierarchical graph representing regions and endpoints relative to locations of the items within the store is obtained based on the item identifiers and the store identifier. Each item identifier is connected in the list to a nearest endpoint identified in the hierarchical graph producing a modified graph comprising relevant endpoints. An optimal path is identified through the relevant endpoints in the modified graph. Traversed endpoints are identified between each segment of the optimal path. The traversed endpoints are grouped by unique region and a navigational instruction is generated when a given unique region is changed, and the navigational instructions are provided.

DETAILED DESCRIPTION

Figure 1A:
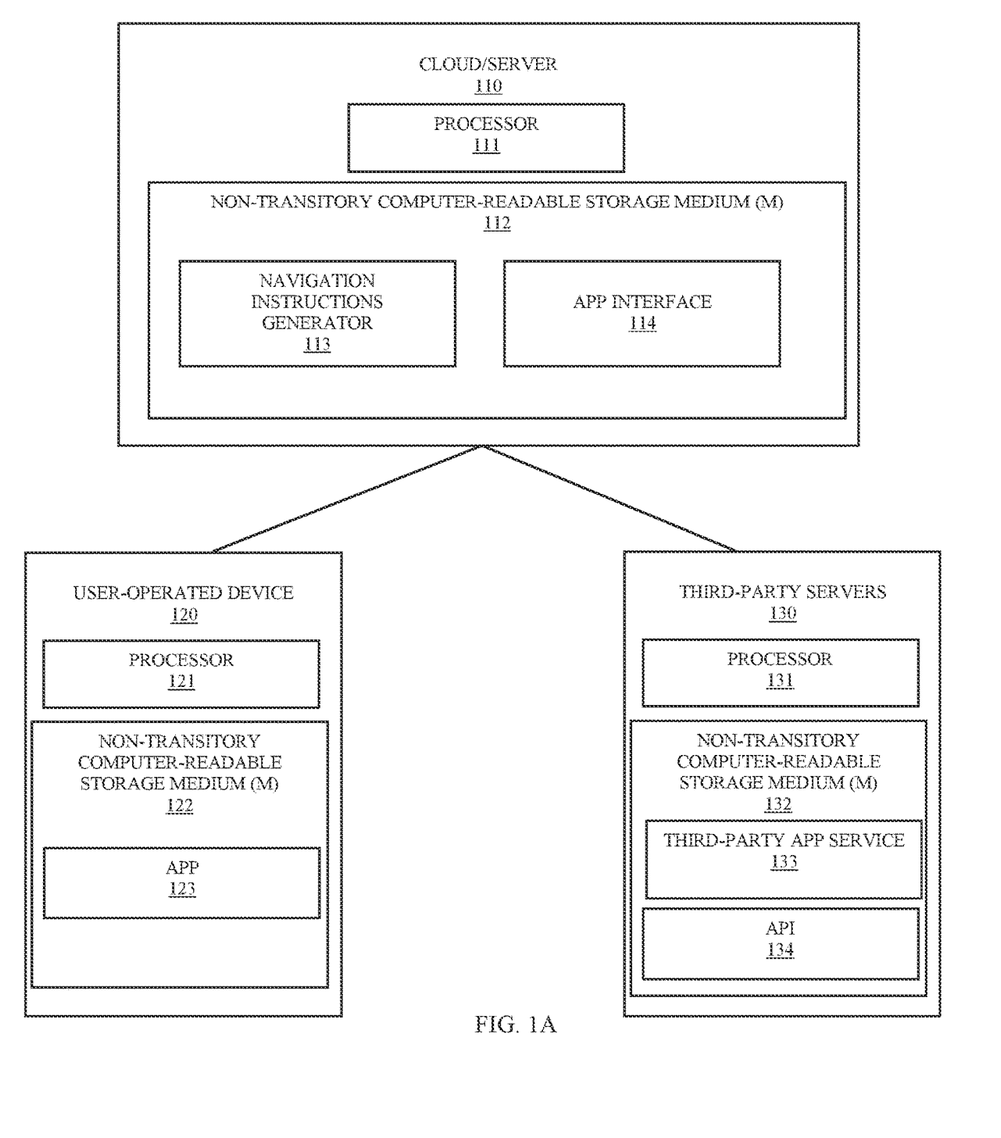
FIG. 1A is a diagram of a system for providing in-store navigation instructions, according to an example embodiment.

FIG. 1A is a diagram of a system 100 for providing in-store navigation instructions, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of providing in-store navigation instructions presented herein and below.

As will be discussed in the various embodiments that follow, the teachings provide that given a list of items and a store location of a store from which the items are to be obtained, optimal navigation instructions are provided back to the requester that provided the list. The compute time for generating the navigation instructions is substantially reduced from would conventionally be required for such a problem.

For example, an attempt to conventionally programmatically generate an optimal path through a store would result in infeasible compute response times. One may attempt to represent the store as a strongly connected graph of items and then utilize a Traveling Sales Person (TSP) algorithm. However, given a shopping list with only 30 items, using an optimized TSP algorithm would take roughly 20 minutes to sort the items (given TSP→$O(n^2 * 2^n)$).

This is not an issue with the teachings provided herein and the computer time is substantially reduced. The techniques organizes information needed to solve the problem such that only a subset of the locations for the items are considered at any given time during searching, i.e. clustering. Moreover, the techniques provided do not rely on location services of the user device or the store itself, such that there is no dependency on the accuracy on reported location information.

As used herein, an "item" is an element of a shopping list; a "region" is a semantic labeled section within the store (i.e., aisle, department, checkout counters, etc.); an "endpoint" is a specific location that is an access point for the regions, connects adjacent regions, and serves as a tether point for all items within a given region; and a "node" is an vertex in a graph, representing either an endpoint or an item.

System 100 comprises a cloud or server 110 and a user-operated device 120. Optionally, system 100 includes a plurality of third-party servers 130.

Cloud/Server 110 comprises at least one processor 111 and a non-transitory computer-readable storage medium 112, Medium 112 comprises executable instructions for a navigation instructions generator 113 and an application (app) interface 114. The executable instructions when executed by processor 111 from the medium 112 cause processor 111 to perform operations discussed herein and below with navigation instructions generator 113 and app interface 114.

Each user-operated device 120 comprises a processor 121 and a non-transitory computer-readable storage medium 122. Medium 122 comprises executable instructions for a mobile app 123. The executable instructions when executed by processor 121 from medium 122 cause processor 121 to perform operations discussed herein and below with respect to app 123.

Each optional third-party server 130 comprises a processor 131 and a non-transitory computer-readable storage medium 132. Medium 132 comprises executable instructions for a third-party app service 133 and an Application Programming Interface 134. The executable instructions when executed by processor 131 from medium 132 cause processor 131 to perform operations discussed herein and below with respect to app service 133 and API 134.

Navigation instructions generator 113 receives as input a list of items provided by app 123 or, optionally, provided via API 134 from third-party app service 133 to app interface 114. App 123 or API 134 also provides a store identifier or store name associated with a store for which the items on the list are to be purchased by a shopper (the shopper operates device 120).

Navigation instructions generator 113 inspects the map data for a given store and connects the items on the list.

Figure 1B:
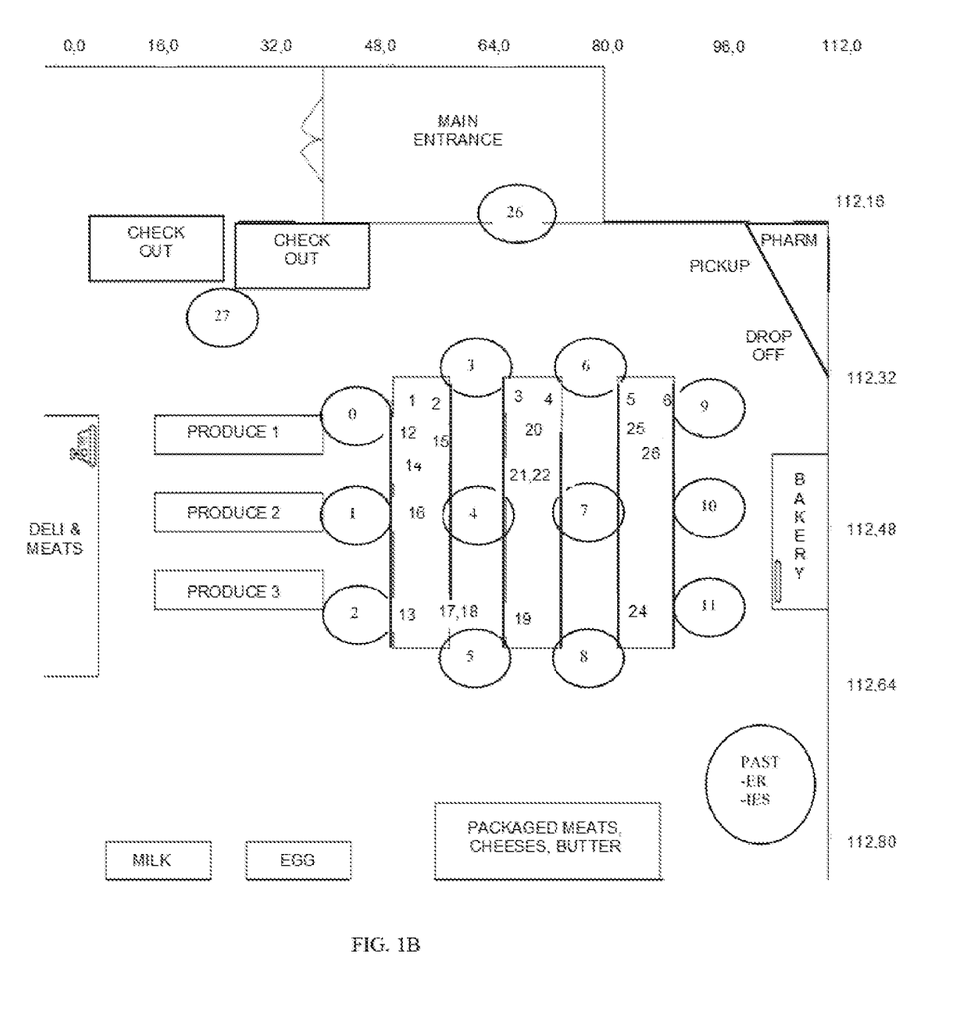
FIG. 1B is a diagram illustrating an example labeled map data for a store, according to an example embodiment.

The processing of the navigation instructions generated will be discussed in the context of an example store and an example 4 item shopping list illustrated in FIG. 1B, according to an example embodiment.

The 4 items on the shopping list are:
1. La Croix Sparkling Water Variety Pack® (labeled as 19 in FIG. 1B;
2. Sabra Hummus Roasted Red Peppers® (labeled as 12 in FIG. 1B);
3. Dave's Organic 21 Whole Grain® (labeled as 25 in FIG. in the aisle identified as 6 (circle with 6 in it)); and
4. Cap'n Crunch Berriesweetened Corn and Oat Cereal® (labeled as 24 in FIG. 1B).

Navigation instructions generator 113 constructs hierarchical map data from information maintained for the store using the store's items, regions, and endpoints as the nodes of the graph/map data. Each item in the list is then connected to that item's nearest endpoint and a pathfinding algorithm is processed to find an intermediate path between the endpoints. This results in a strongly-connect graph of the relevant endpoints (adjacency matrix).

An example, adjacency matrix for the example 4-item list may appear as follows:

```
[
    [999999, 67, 53, 71, 999999, 35], //item 1
    [67, 999999, 68, 54, 999999, 82], //item 2
    [53, 68, 999999, 32, 999999, 72], //item 3
    [71, 54, 32, 999999, 999999, 87], //item 4
    [47, 50, 52, 999999, 999999, 52], //entrance
    [999999, 999999, 999999, 999999, 999999, 999999]
//exit
]
```

Navigation instructions manager 113 then uses a modified TSP algorithm to generate an optimized, ordered-list of items based on the optimal path through each endpoint. The path is parameterized with a start endpoint (store entrance 26 in FIG. 1B) and an end endpoint (store checkout region 27 in the FIG. 1B). For example, sorted items: [26, 25, 24, 19, 12, 27] where 26 is the entrance and 27 is the exit of the store.

Navigation instructions manager 113 produces the instructions from getting from item A to item B by analyzing each segment of the journey independently, such as: entrance→item 0, item 0→item 1, item 1→item 2, . . . item n→checkout. For each segment a Dijkstra algorithm is processed on the full graph, with item A as the start and item B as the destination. This produces a list of endpoints that are hit along the journey from A→B. For example:

PATH[26, 6, 9, 25]//entrance→item 0
PATH[25, 9, 6, 23, 7, 22, 8, 24]//item 0→item 1
PATH[24, 8, 5, 19]//item 1→item 2
PATH[19, 5, 2, 13, 1, 0, 12]//item 2→item 3
PATH[12, 0, 3, 27]//item 3→exit Next, navigation instructions manager 113 groups the lists of endpoints by region and feeds a new instruction only when changing regions. This reduces the list of endpoints to contain only the necessary nodes for producing the navigation instructions for the shopper. For example, before reduction:

endpoint|26|6|9|2
Region|Entrance|Front of Aisles 4-5|Front of Aisle 6|Item: Dave's Organic 21 Whole Grain
After reduction:
Endpoint|26|9|25
Region|Entrance|Front of Aisle 6|Item: Dave's Organic 21 Whole Grain.
Note the omission of Endpoint 6 following reduction, this was removed because nodes 6 and 9 are both members of the Front of Aisle region.

The above-referenced approach is repeated by the navigation instructions manager 113 for every pair of items within the list of items.

Finally, the list of regions are then translated into a list of intuitive instructions in text that can be read to the shopper and can be provided in any number of manners, such as through app 123, through an existing third-party app service 133, through a text message sent to device 120, read by voice services of device 120, etc. For example:

Reduced List:
Endpoint|26|9|25
Region|Entrance|Front of Aisle 6|Item: Dave's Organic 21 Whole Grain.
Resulting in readable instructions to the shopper as:
1) from the main entrance, head toward the end of the aisles closer to the front of the store; in the Artesian Breads section, at aisle 6, pickup one item for Dave's Organic 21 Whole Grain;
2) From the Artesian Breads section, head toward the end of the Aisles closer to the back of the store; in the canned foods and cereals section, at aisles 4 and 5, pick up one item—Cap'N Crunch Berriesweetened Corn & Oat Cereal®, aisle 5;
3) from the canned foods and cereals, head toward the nuts and waters section at aisles 2 and 3, pickup one item—La Croix Sparkling Water Variety Pack®, aisle 3;
4) from the nuts and waters section, head toward the end of the aisles closer to the front of the store; in the hummus section, at aisle 1, pickup one item—Sabra Hummus, Roasted Red Pepper®;
5) you have completed your shopping list: head toward the checkout lanes located at the front of the store, to your left when facing the front of the store.

Conventional approaches to indoor or venue instructions have relied on hardware and a hardware dependent. Such techniques may include Bluetooth® beacons, specialized lighting, cameras, shelf sensors, etc. These attempts are costly due to the hardware investment and software integration required to utilize the hardware.

Conversely, system 100 utilizes domain-specific or store-specific knowledge of relative location of regions and items throughout a given store in order to deduce a shopper's location along a designated shopping path. This completely avoids any hardware requirements of location tracking on the shopper within the store. Moreover, once the navigation instructions are provided to the shopper, the device 130 of the shopper does not require any network connectivity and the full set of navigation instructions are available in text for reading by the shopper while at the store. Again, the instructions can be provided in its own customized app 123, integrated within a third-party app service 133 via API 134 (such as Instacart®, and others), provided as a text message, read through the user's device speaking services, etc.

In an embodiment, each step of the navigational instruction may be presented on device or communicated from device 120 to the user in an interactive manner via the app 123, such as show me the next navigational instruction and the user instructs the app 123 to display the next navigational struct and/or speak in natural language the next instruction based on the user pressing a next-step button or speaking "read me the next step." Thus, app 123 may be interactive and/or use both text and or speech to give the user the next navigational step for picking the items of the order. Furthermore, the user may have headsets or wireless ear pieces for hearing any spoken next navigational instruction from app 123.

In an embodiment, the user is a customer and not a professional shopper, such that consumers can benefit from the optimal path on their shopping lists.

In an embodiment, navigation instructions manager 113 may receive multiple lists for multiple orders at a single store via app interface 114. Each list provided a label by the shopper. As instructions are given, the instructions inform the shopper where each picked item is to go, for example bottled water goes in basket or bag A for order X and chips goes in basket B for order Y, This may also allow instore pickers to fulfill multiple orders at a time within the store using the optimal path picking techniques of instructions manager 113.

In an embodiment, app interface 114 may be further interfaced with a given store's inventory system, such that any items on the list that are known to be out-of-stock can be communicated via app 123 to the user along with a potential in-stock replacement for the out-of-stock item. This replacement item can be communicated, via app 123, before the user is at the store to pick the items from the list and/or as the user is picking the list in real time.

In an embodiment, the domain knowledge associated with any given store can be entered via app interface 114 to instructions manager 113 by employees of the store, professional shoppers, consumers, etc. In this way, more detailed landmarks or semantic information for endpoints and regions can be maintained and integrated into the processing of manager 113 for more descriptive navigational instructions produced by manager 113.

In an embodiment, the endpoints and regions are mapped to a planogram of the store based on aisle numbers and shelf numbers provided for each item by the store. When the planogram changes or an item location within the planogram (for example shelf number and aisle number), the endpoints and regions can be adjusted automatically during navigation instruction generation by manager 113 based on the reported location of the item within the updated planogram and endpoints and regions maintained in the hierarchical map for the store.

The above-referenced embodiments and other embodiments are now discussed with reference to FIG. 2.

Figure 2:
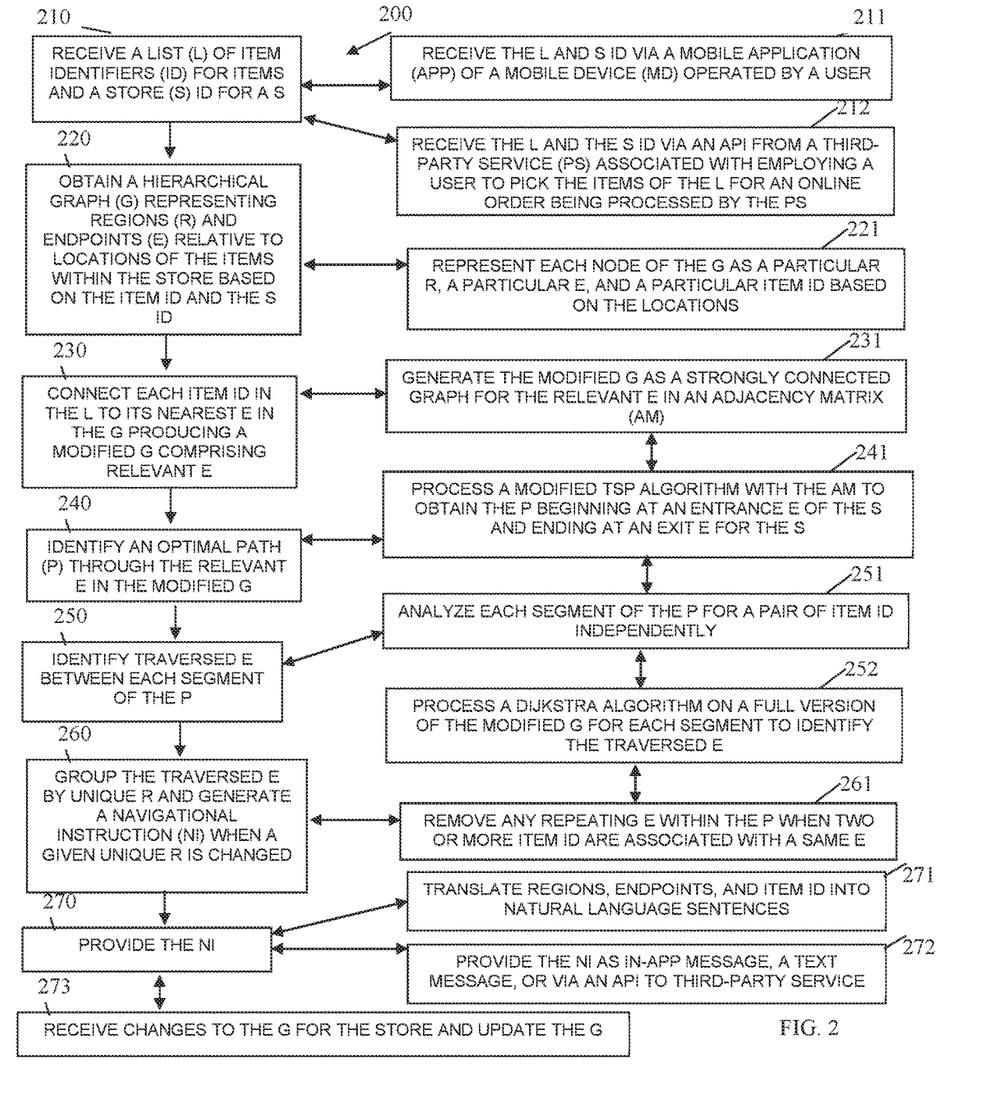
FIG. 2 is a diagram of a method for providing in-store navigation instructions, according to an example embodiment.

FIG. 2 is a diagram of a method 200 for providing in-store navigation instructions, according to an example embodiment. The software module(s) that implements the method 200 is referred to as a "semantic in-store navigation manager." The semantic in-store navigation manager is implemented as executable instructions programmed and residing within memory and/or a non-transitory computer-readable (processor-readable) storage medium and executed by one or more processors of one or more devices. The processor(s) of the device(s) that executes the semantic in-store navigation manager are specifically configured and programmed to process the semantic in-store navigation manager. The semantic in-store navigation manager has access to one or more network connections during its processing. The connections can be wired, wireless, or a combination of wired and wireless.

In an embodiment, the device that executes the semantic in-store navigation manager is cloud 110. In an embodiment, the device that executes semantic in-store navigation manager is server 110.

In an embodiment, the semantic in-store navigation manager is all of, or some combination of navigation instructions manager 113 and/or app interface 114.

At 210, semantic in-store navigation manager receives a list of item identifiers for items of a shopping or picking list and a store identifier for a store.

In an embodiment, at 211, the semantic in-store navigation manager receives the list and the store identifier via a mobile application 133 of a mobile device operated by a user (professional shopper, employee of the store fulfilling online orders, and/or a consumer).

In an embodiment, at 212, the semantic in-store navigation manager receives the list and the store identifier via an API 134 from a third-party service associated with employing a user to pick the items of the list for an online order being processed by a third-party service 133.

At 220, the semantic in-store navigation manager obtains a hierarchical graph representing regions and endpoints relative to locations of the items within the store based on the item identifiers and the store identifier.

In an embodiment, at 221, the semantic in-store navigation manager represents each node of the hierarchical graph as a particular region, a particular endpoint, and a particular item identifier based on the locations.

At 230, the semantic in-store navigation manager connects each item in the list to its nearest endpoint represented in the hierarchical graph producing a modified hierarchical graph that comprises relevant endpoints.

In an embodiment, at 231, the semantic in-store navigation manager generates the modified graph as a strongly connected graph for the relevant endpoints in an adjacency matrix.

At 240, the semantic in-store navigation manager identifies an optimal path through the relevant endpoints in the modified graph.

In an embodiment of 231 and 240, at 241, the semantic in-store navigation manager process a modified TSP algorithm with the adjacency matrix to obtain the path beginning at an entrance endpoint of the store and ending at an exit endpoint for the store.

At 250, the semantic in-store navigation manager identifies traversed endpoints between each segment of the optimal path.

In an embodiment of 241 and 250, at 251, the semantic in-store navigation manager analyzes each segment of the path for a pair of item identifiers independently.

In an embodiment of 251 and at 252, the semantic in-store navigation manager processes a Dijkstra algorithm on a full version of the modified graph for each segment to identify the traversed endpoints.

At 260, the semantic in-store navigation manager groups the traversed endpoints by unique region and generates a navigational instruction when a given unique region is changed.

In an embodiment of 252 and 260, at 261, the semantic in-store navigation manager removes any repeating endpoint within the path when two or more item identifiers are associated with a same endpoint.

At 270, the semantic in-store navigation manager provides the navigational instructions produced at 260 in response to having received the list and the store identifier at 210.

In an embodiment, at 271, the semantic in-store navigation manager translates regions, endpoints, and item identifiers into natural language sentences.

In an embodiment, at 272, the semantic in-store navigation manager provides the navigational instructions as an in-app message, a text message, or an API to a third-party service.

In an embodiment, at 273, the semantic in-store navigation manager receives changes to the hierarchical graph for the store via app interface 114 and updates the graph accordingly.

Figure 3:
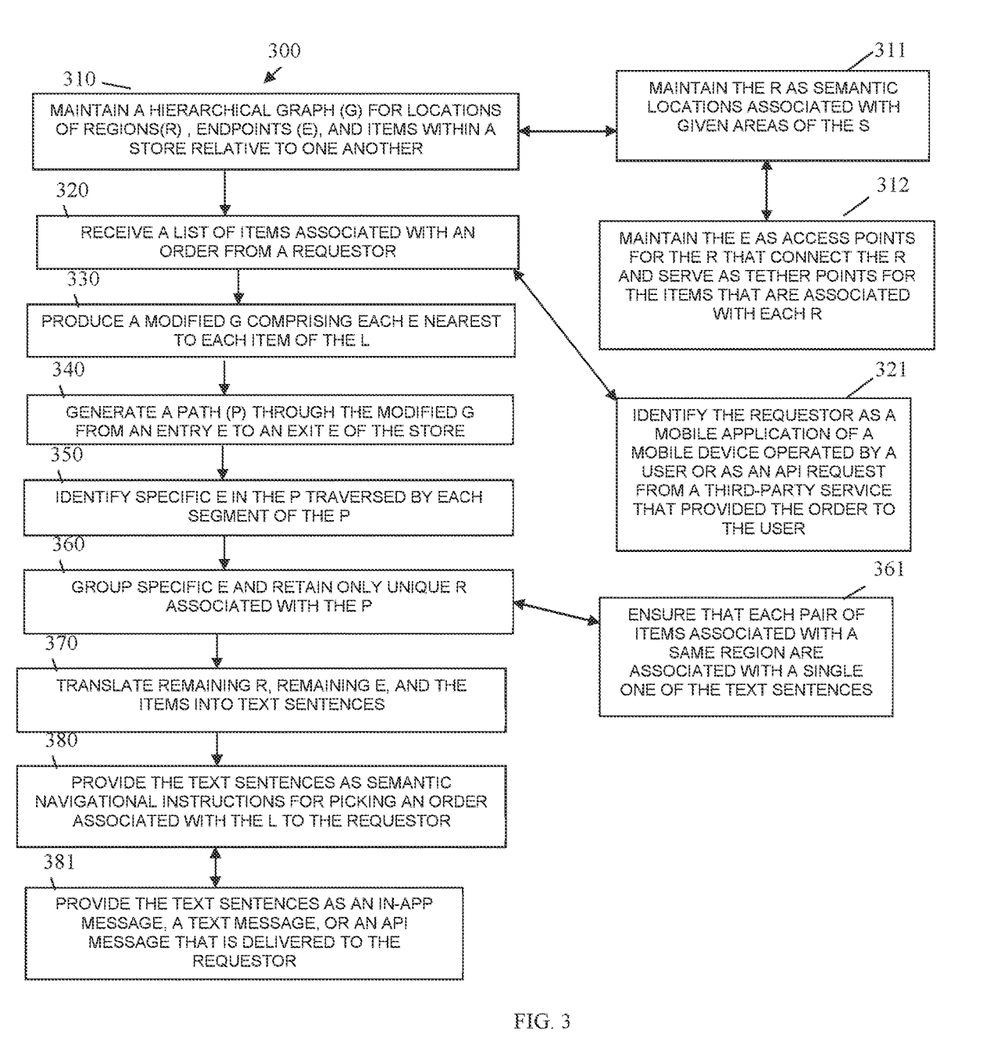
FIG. 3 is a diagram of another method for providing in-store navigation instructions, according to an example embodiment.

FIG. 3 is a diagram of another method 300 for providing in-store navigation instructions, according to an example embodiment. The software module(s) that implements the method 300 is referred to as an "in-store navigation manager." The in-store navigation manager is implemented as executable instructions programmed and residing within memory and/or a non-transitory computer-readable (processor-readable) storage medium and executed by one or more processors of one or more devices. The processor(s) of the device(s) that executes the in-store navigation manager are specifically configured and programmed to process the in-store navigation manager. The in-store navigation manager has access to one or more network connections during its processing. The network connections can be wired, wireless, or a combination of wired and wireless.

In an embodiment, the device that executes the in-store navigation manager is cloud 110. In an embodiment, the device that executes the in-store navigation manager is server 110.

In an embodiment, the in-store navigation manager is all of, or some combination of navigation instructions manager 113, app interface 114, app 133, API 124, and/or method 200.

The processing of the in-store navigation manager represents another and, in some ways, enhanced processing perspective from that which was discussed above with FIG. 1A, FIG. 1B, and method 200 of FIG. 2.

At 310, the in-store navigation manager maintains a hierarchical graph for locations of regions, endpoints, and items within a store relative to one another.

In an embodiment, at 311, the in-store navigation manager maintains the regions as semantic locations associated with given areas of the store.

In an embodiment of 311 and at 312, the in-store navigation manager maintains the endpoints as access points for the regions that connect the regions and serve as tether points for the items that are associated with each region.

At 320, the in-store navigation manager receives a list of items associated with an order from a requestor.

In an embodiment, at 321, the in-store navigation manager identifies the requestor as a mobile application of a mobile device operated by a user or as an API request from a third-party service that provided the order to the user.

At 330, the in-store navigation manager produces a modified graph comprising each endpoint nearest to each item of the list.

At 340, the in-store navigation manager generates a path through the modified graph from an entry endpoint to an exit endpoint of the store.

In an embodiment, at 350, the in-store navigation manager identifies specific endpoints in the path traversed by each segment of the path.

In an embodiment, at 360, the in-store navigation manager groups specific endpoints and retains only unique regions associated with the path.

In an embodiment, at 361, the in-store navigation manager ensures that each pair of items associated with a same region are associated with a single one of the text sentences produced at 370.

At 370, the in-store navigation manager translates remaining regions, remaining endpoints, and the items into text sentences.

At 380, the in-store navigation manager provides the text sentences as navigational instructions for picking the order associated with the list to the requestor.

In an embodiment, at 381, the in-store navigation manager provides the text sentences as an in-app message, a text message, or an API message that is delivered to the requestor.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive, Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving a list of item identifiers for items and a store identifier for a store;

obtaining a hierarchical graph representing regions and endpoints relative to locations of the items within the store based on the list of item identifiers and the store identifier;

connecting each item identifier in the list of item identifiers to a nearest endpoint identified in the hierarchical graph producing a modified graph comprising relevant endpoints;

identifying an optimal path through the relevant endpoints in the modified graph;

identifying traversed endpoints between each segment of the optimal path;

grouping the traversed endpoints by unique region and generating navigational instructions when a given unique region is changed; and providing the navigational instructions;

wherein compute time for generating the navigational instructions is substantially reduced by organizing information such that only a subset of the locations for the items are considered at any given time during searching through clustering;

wherein the navigational instructions do not rely on location services of a user device or the store;

wherein the navigational instructions are generated by analyzing each segment of a path independently using a Dijkstra algorithm on a full modified graph to produce a list of endpoints hit along each journey between items;

wherein the navigational instructions are provided in its own customized app, integrated within a third-party app service via API, provided as a text message, read through speaking services of the user device, or any combination thereof;

wherein the instructions are produced from getting from item A to item B by analyzing each segment of the journey independently, including entrance to item zero, item zero to item one, item one to item two, continuing through item n to checkout, and wherein for each segment the Dijkstra algorithm is processed on the full graph with item A as the start and item B as the destination to produce a list of endpoints that are hit along the journey from A to B.

2. The method of claim 1, wherein receiving further includes receiving the list of item identifiers and receiving the store identifier via a mobile application of a mobile device operated by a user.

3. The method of claim 1, wherein receiving further includes receiving the list of item identifiers and store identifier via an application programming interface (API) from a third-party service associated with employing a user to pick the items of the list of item identifiers for an online order being processed by the third-party service.

4. The method of claim 1, wherein obtaining further includes representing each node in the hierarchical graph as a particular region, a particular endpoint, and a particular item identifier based on the locations.

5. The method of claim 1, wherein connecting further includes generating the modified graph as a strongly connected graph for the relevant endpoints represented in an adjacency matrix.

6. The method of claim 5, wherein identifying the optimal path further includes processing a modified Traveling Sales Person (TSP) algorithm with the adjacency matrix to obtain the optimal path beginning at an entrance endpoint for the store and ending at an exit endpoint for the store.

7. The method of claim 6, wherein identifying the traversed endpoints further includes analyzing each segment of the optimal path for a pair of item identifiers independently.

8. The method of claim 7, wherein analyzing further includes processing the Dijkstra algorithm on a full version of the modified graph for each segment to identify the traversed endpoints.

9. The method of claim 8, wherein grouping further includes removing any repeating endpoint within the optimal path when two or more item identifiers are associated with a same corresponding endpoint.

10. The method of claim 9, wherein providing further includes translating region identifiers for the regions that remain in the navigational instructions, endpoint identifiers for the endpoints that remain in the navigational instructions, and item identifiers for the items of the list of item identifiers into natural language text sentences and provide the natural language text sentences as the navigational instructions.

11. The method of claim 1, wherein providing further includes providing the navigational instructions as an in-app message to a mobile application of a mobile device, as a text message to the mobile device, or as an application programming interface (API) message to a third-party service.

12. The method of claim 1 further comprising, receiving changes to the hierarchical graph for the store and updating the hierarchical graph with the changes.

13. A method, comprising:

maintaining hierarchical graph for locations of regions, endpoints, and items within a store relative to one another;

receive a list of item identifiers for items associated with an order from a requestor;

producing a modified graph comprising each endpoint nearest to each item of the list of item identifiers;

generating a path through the modified graph from an entry endpoint to an exit endpoint of the store;

identifying specific endpoints in the path traversed by each segment of the path;

grouping the specific endpoints and retaining only unique regions associated with the path;

translating remaining regions, remaining endpoints, and the items into text sentences; and providing the text sentences as semantic navigational instructions for picking the order associated with the list of item identifiers to the requestor;

wherein the semantic navigational instructions are generated without any hardware requirements of location tracking within the store by utilizing domain-specific knowledge of relative locations of regions and items throughout the store to deduce a location along a designated shopping path;

wherein the semantic navigational instructions are generated by parameterizing the path with a store entrance endpoint and a store checkout endpoint and processing a modified Traveling Sales Person (TSP) algorithm to generate an optimized, ordered list of items based on an optimal path through each endpoint;

wherein each step of the semantic navigational instructions is presented on a device or communicated from the device to a user in an interactive manner via an application, such that the user instructs the application to display a next semantic navigational instruction and/or speak in natural language the next semantic navigational instruction based on the user pressing a next-step button or speaking "read me next step";

wherein the instructions are produced from getting from item A to item B by analyzing each segment of the journey independently, including entrance to item zero, item zero to item one, item one to item two, continuing through item n to checkout, and wherein for each segment a Dijkstra algorithm is processed on the full graph with item A as the start and item B as the destination to produce a list of endpoints that are hit along the journey from A to B.

14. The method of claim 13 wherein maintaining further includes maintaining the regions as semantic locations associated with given areas of the store.

15. The method of claim 14, wherein maintaining further includes maintaining the endpoints as access points for the regions that connect the regions and serve as tether points for the items that are associated with each region.

16. The method of claim 13, wherein receiving the list of item identifiers further includes identifying the requestor as a mobile application of a mobile device operated by a user or as an Application Programming Interface (API) request from a third-party service that provided the order to the user.

17. The method of claim 16, wherein grouping further includes ensuring that each pair of items associated with a same region are associated with a single one of the text sentences.

18. The method of claim 17, wherein providing further includes providing the text sentences as an in-app message, a text message, or an Application Programming Interface (API) message.

19. A system, comprising:
a cloud or a server;
wherein the cloud or the server is configured to:
receive a list of item identifiers for items associated with an order that is to be picked at a store;
represent the store in a hierarchical graph comprising regions, endpoints, and items relative to physical locations of the regions, the endpoints, and the items within the store;
connect each item to a nearest endpoint identified in the hierarchical graph and producing a modified graph;
generate an optimal path through the modified graph beginning at an entry endpoint and ending at an exit endpoint;
identify specific endpoints traversed by each segment of the optimal path;
group duplicate endpoints from the specific endpoints and retain only unique regions associated with the optimal path;
translate remaining regions, remaining endpoints, and the items into a natural language text sentences; and
provide text sentences to a requestor that provided the list of item identifiers as optimal navigational instructions for picking the order at the store;
wherein the optimal navigational instructions are generated with substantially reduced compute response times by representing only a subset of relevant endpoints in an adjacency matrix rather than representing the store as a strongly connected graph of all items;
wherein the adjacency matrix represents distances between pairs of endpoints for the items on the list of item identifiers, with the adjacency matrix including an entrance endpoint and an exit endpoint;
wherein once the optimal navigational instructions are provided to the requestor, a device of the requestor does not require any network connectivity and a full set of navigational instructions are available in text for reading by the requestor while at the store;
wherein the instructions are produced from getting from item A to item B by analyzing each segment of the journey independently, including entrance to item zero, item zero to item one, item one to item two, continuing through item n to checkout, and wherein for each segment a Dijkstra algorithm is processed on the full graph with item A as the start and item B as the destination to produce a list of endpoints that are hit along the journey from A to B.

20. The system of claim 19, wherein the cloud or server is further configured to provide the optimal navigational instructions as a text message to the requestor, as an in-app message to a mobile application operated by the requestor, or as an Application Programming Interface (API) message of a third-party service that generated the order for an online order of a customer of the third-party service.

* * * * *